United States Patent Office 3,257,509
Patented June 21, 1966

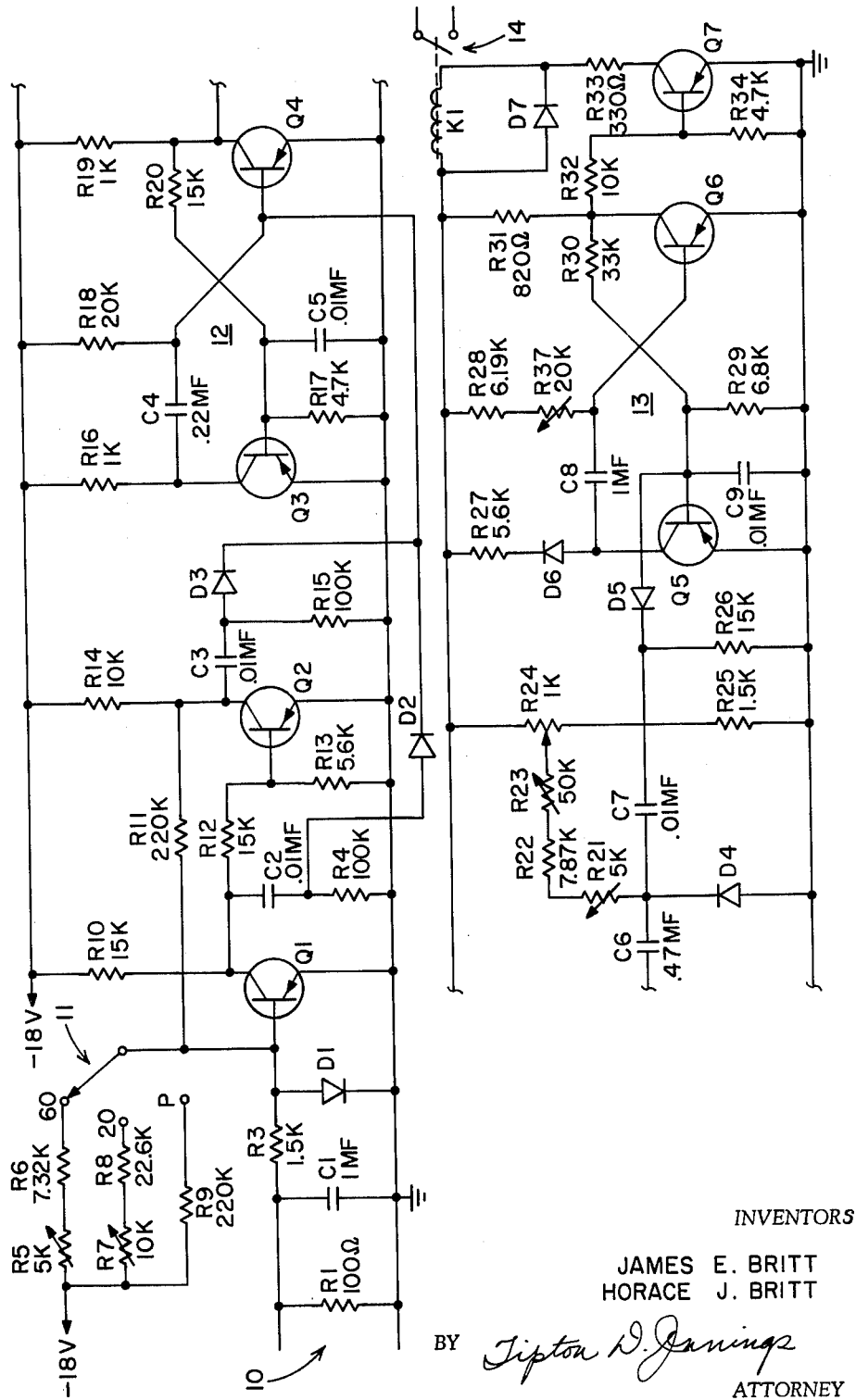

3,257,509
MEASURING DEVICE
James E. Britt, Annandale, and Horace J. Britt, Alexandria, Va., assignors to Atlantic Research Corporation, County of Fairfax, Va., a corporation of Virginia
Filed Mar. 2, 1964, Ser. No. 348,418
10 Claims. (Cl. 178—69)

The present invention relates in general to pulse distortion meausuring equipment, and more particularly to apparatus for measuring and indicating distortion of marking and spacing pulses in code signals such as those used in teletypewriter or data transmission systems.

For effective control and trouble shooting of circuits of the type encountered in teletypewriter and data transmission systems employing coded trains of impulses, it is useful to be able to reliably detect the existence of distortion of the signal impulses. There are several basic types of distortion which affect the reliability of telegraph and data signals to produce proper operation of the system components. A common feature of each of these types of distortion is that the marking or spacing pulses are lengthened or shortened by the distortion, either in a uniform or a random manner. By measuring the pulses by comparing, in some way, the shortest pulse of a series of pulses with a standard or unit pulse length, the amount of distortion can be discerned. This technique of measuring the shortest pulse affords a means of detecting the basic types of telegraph signal distortion with a reasonable sampling of pulses. It has been found that as long as the signals do not exceed a given amount of distortion, they are sufficiently intelligible to provide reliable operation of the system equipment, so that test equipment which reliably monitors the signals to ensure that they do not exceed a particular amount of distortion is usually adequate.

Many of the prior art devices operated only on marking pulses or spacing pulses, but not both so that these devices were limited in their application because of the requirement that the signals have a particular formation. However, a recent patent, No. 3,084,220, entitled Measuring Devices, issued to Horace J. Britt on April 2, 1963, disclosed novel pulse distortion measuring apparatus for measuring and indicating the occurrence of either marking or spacing pulses which were shorter than a selected unit or standard pulse length. In the apparatus described in that patent a Mark-Space selector switch is set in the position corresponding to the type of input pulse which it is desired to measure, i.e., marking or spacing. However, there are certain uses or applications of pulse distortion measuring equipment in which there is no requirement to know whether distortion is occurring specifically during a mark or space impulse. Rather the requirement is to monitor or measure all types of incoming pulses to see whether the distortion stays within a prescribed or predetermined range irrespective of which type pulse is being distorted. Such a use for this equipment is found in test center installations in which the equipment is connected to some visible or audible indicating means whereby periodic checks of the indicating means will indicate to maintenance personnel whether or not distortion of incoming teletypewriter signals are staying within the prescribed range and are thereby acceptable.

The present invention relates to equipment of this latter type and an object of this invention is to provide novel pulse distortion measuring apparatus containing a single measuring channel for measuring different types of input pulses such as both the marking and spacing pulses found in teletypewriter signals.

Another object of the invention is to provide such apparatus having a single measuring circuit which can be used for measuring different type of input pulses without any requirement that the apparatus be readied for a particular type of impulse, e.g., marking or spacing pulses.

A further object of the present invention is to provide such apparatus which operates independently of the type of input pulse and relies instead on pulse transitions in the input signal to control or initiate the distortion measurement operation.

Other objects, advantages, and capabilities of the present invention will become apparent from the following detailed description taken in conjunction with the sole accompanying figure which illustrates the preferred embodiment of the present invention in schematic diagram form.

Referring to this figure, the device of the present invention is a fully transistorized signal distortion indicator for use by maintenance personnel in monitoring various level impulse code teletypewriter signals at different transmitting speeds such as 60, 75, or 100 words per minute to determine whether the incoming mark and space pulses are shorter than a preselected unit or standard length. An input selection switch is provided to set the apparatus to measure pulses of 20 ma. level at one position, pulses of 60 ma. level at another position, and pulses varying above and below zero (polar) at a position labeled "P". The circuit in general comprises a monostable or one-shot multivibrator triggered in response to the transitions of the marking and spacing pulses in the incoming signals. A variable timing circuit operates in response to the change of conductive state within the multivibrator to determine whether the length of any incoming pulse is shorter than the standard pulse length established by the setting of the variable timing circuit.

In the ensuing detailed description of the components and operation of the circuit, the components will be described generally in the order they are encountered by the incoming signals. The signals are introduced at the input 10 to a voltage divider network including resistors R1, R3, and the resistors R5 to R9 as determined by the setting of the movable contact of input selector switch 11 having polar, 20 ma., and 60 ma. positions, respectively. The signals are applied to the base of input transistor Q1 whose collector is connected through R10 to −18 volt potential source, and whose emitter is connected directly to circuit ground. The diode D1 is connected between the base of input transistor Q1 and ground. The base of transistor Q2 is connected to the collector of transistor Q1 through resistor R12 and to ground through resistor R13, its emitter is connected directly to ground, and its collector is connected to the −18 volt source through resistor R14. The collector of transistor Q2 is also connected to the base of transistor Q1 through resistor R11. The outputs of both transistor Q1 and transistor Q2 are applied to the base of transistor Q4 through differentiating networks comprising capacitor C2, resistor R4, and capacitor C3, resistor R15, respectively. Diode D2 and diode D3 are connected between the differentiators and the base of transistor Q4.

Transistors Q3 and Q4 form a one-shot or monostable multivibrator 12, triggered by voltage spikes applied to the base of transistor Q4. The emitters of both of these transistors are connected to ground while their collectors are connected to the −18 volt source through resistor R16 and resistor R19, respectively. The collector of transistor Q4 is also connected to the base of transistor Q3 through resistor R20 and the collector of transistor Q3 is connected to the base of transistor Q4 through capacitor C4. A resistor R18 is connected between the −18 volt source and the junction of capacitor C4 and the base of transistor Q4. A resistor R17 and capacitor C5 are connected in parallel to ground at the junction of the base of transistor Q3 and resistor R20.

The output of the multivibrator 12 is taken at the collector of transistor Q4 to which is connected the left side of timing capacitor C6. The right side of this timing capacitor C6 is connected to the −18 volt potential source through the resistive network consisting of potentiometers R21, R23, and R24, and resistors R22, and R25. The combination of potentiometer R24 and resistor R25 form a voltage divider to establish the voltage level for the RC Timing circuit. Potentiometer R23 is calibrated in percentage distortion for the various teletypewriter baud rates. The setting of potentiometer R23 during a measurement condition will establish the maximum percent distortion of the incoming signals which can pass through the circuit without activating the indicating means. Potentiometer R21 permits fine adjustment for calibrating the timing circuit.

The right side of capacitor C6 is prevented from going below essentially ground potential by the diode D4 connected to ground. The right side of timing capacitor C6 is also connected through capacitor C7 and isolating diode D5 to the base of transistor Q5. The junction of capacitor C7 and diode D5 is connected to ground through resistor R26.

The combination of transistor Q5 and transistor Q6 form another one-shot multivibrator 13 which is used to drive the indicating circuitry. The emitters of these two transistors are connected to ground. The collector of transistor Q6 is connected to the −18 volt source through resistor R31 and the collector of Q5 is connected to the same voltage supply by resistor R27 and diode D6, which diode provides isolation for the multivibrator 13 from transients in the power supply. The collector of transistor Q6 is also connected to the base of Q5 by resistor R30 and the collector of Q5 is connected to the base of Q6 through capacitor C8. The right side of this capacitor is connected to the −18 volt source by the combination of potentiometer R37 and resistor R28. The base of transistor Q5 is connected to ground through the parallel circuit of capacitor C9 and resistor R29. The output of this one-shot multivibrator 13 is applied across resistor R32 to the base of transistor Q7, the base being connected to ground through resistor R34. The emitter of transistor Q7 is connected directly to ground and the collector is connected to the winding K1 of relay 14 and to protective diode D7. This relay 14 can be used to actuate indicating means such as an alarm, a light, or a counting circuit.

In measuring shaped pulses it is important that transistor Q1 trigger at the half-current level to simulate the operation of relays used in teletypewriter system components. Resistors R5 to R9 associated with switch 11 provide the proper bias on transistor Q1 for a half-current triggering level for 20 ma., 60 ma., and polar signals. Resistor R1 and capacitor C1 act as a filter network to introduce a slight time delay in the response of transistor Q1 to the teletypewriter signal transitions so as to prevent transistor Q1 from operating falsely due to short interruption of the pulse as, for example, from relay bounce. Diode D1 makes the resistance of the base-emitter circut of transistor Q1 more symmetrical to the delay circuit through the on and off condition of transistor Q1 and also acts to conduct positive input voltage to ground to protect the emitter-base junction of transistor Q1 from excessive reverse breakdown voltages.

For convenience it will be assumed that the resistor R1 is connected in a 60 ma. neutral teletypewriter circuit and the switch 11 is set to the corresponding 60 ma. position. When the circuit is idle or at marking condition the 60 ma. current produces a voltage drop across the resistor R1 which back-biases transistor Q1 overcoming the forward bias supplied through resistors R5 and R6 from the −18 volt source. Thus, transistor Q1 is off for the marking condition of the circuit.

When the transistor Q1 is off, the −18 volt source through resistors R10 and R12 forward-biases transistor Q2 turning it on. The one-shot multivibrator 12 is in its normal conducting state in which transistor Q4 is conducting and transistor Q3 is non-conducting. With transistor Q4 conducting, its collector and, therefore, the left side of capacitor C6 are at ground potential. Diode D4 is also conducting, making the right side of capacitor C6 at ground potential which results in no charge being present on this capacitor. Capacitor C7 is also uncharged and the one-shot multivibrator 13 is in its normal conductive state in which transistor Q5 is found non-conducting and transistor Q6 conducting. With transistor Q6 conducting, its collector is at ground potential back-biasing transistor Q7. Since Q7 is nonconducting no current flows through its emitter-collector path to energize the winding K1 of relay 14.

When the teletypewriter circuit goes spacing, the mark-to-space transition causes the voltage across resistor R1 to drop to essentially zero and the −18 volt source through resistors R5 and R6 forward biases transistor Q1 and turns it on. As transistor Q1 turns on, the base-emitter current of transistor Q2 is removed and transistor Q2 turns off. As transistor Q2 begins to turn off a negative triggering voltage is regeneratively supplied to the base of transistor Q1 through resistors R14 and R11 causing transistor Q1 to turn on more quickly and transistor Q2 to turn quickly off. At the time transistor Q1 begins to conduct its collector rises from a negative value to approximately ground potential. This positive excursion is differentiated by capacitor C2 and resistor R4 and a positive spike is passed through diode D2 to the base of transistor Q4 switching it off. The collector of transistor Q4 then drops to approximately −18 volts and capacitor C6 charges to this voltage, the charge path being through resistor R19, capacitor C6, and diode D4 to ground.

Coincident with transistor Q4 turning off, transistor Q3 became conducting and its collector dropped to ground potential. Capacitor C4 had been previously charged to a negative potential and this negative voltage on its left side appears as a positive voltage on its right side. This capacitor now begins to discharge through resistor R18. As long as this positive charge remains on the right side of capacitor C4, the base-emitter circuit of transistor Q4 is back biased and transistor Q4 remains nonconducting even though the triggering spike which was applied to its base now disappeared. After approximately 2.5 milliseconds as determined by the time constant of the capacitor C4 and resistor R18, the positive charge on the right side of capacitor C4 disappears and the monostable multivibrator 12 returns to its stable state in which transistor Q4 conducts and transistor Q3 is nonconducting. Thus, for the first 2.5 milliseconds of the incoming spacing pulse, the multivibrator is in its semistable state and timing capacitor C6 is accumulating a full charge since it undergoes five charging time constants during this period.

Once transistor Q4 conducts, its collector rises to ground potential and the negative charge on the left side of capacitor C6 now appears as a positive charge on the right side of this capacitor. Diode D4 cuts off and capacitor C7 instantaneously receives a charge current from capacitor C6, the charge path being through resistor R26 to ground. Capacitor C6 and C7 now begin to discharge, the discharge path being from the negative 18 volt source through potentiometer R24, R23, resistor R22 and potentiometer R21 and from there through capacitor C6 to ground and through capacitor C7 and resistor R26 to ground. The charge on C6 is quite large in proportion to the charge on C7 and for the purpose of this discussion only the charge on C6 will be treated in the ensuing description. The discharge of capacitor C6 occurs exponentially, the time being controlled by the setting of potentiometer R23. Thus, for the remainder of the incoming spacing pulse, capacitor C6 is discharging the charge which it received during the first portion of said pulse.

When the circuit goes marking, the space-to-mark transition turns off transistor Q1 and transistor Q2 turns on, the change in conductive states of these two transistors being once again aided by the feedback through resistor R11. The voltage at the collector of transistor Q2 rises from approximately −18 volts to ground and this positive excursion is differentiated by the combination of capacitor C3 and resistor R15. A positive voltage spike is passed by diode D3 to the base of transistor Q4 and the one-shot multivibrator 12 again switches to its semi-stable state. The collector of transistor Q4 again rises very quickly to nearly −18 volts. If the previous spacing pulse had been equal to or longer than the standard pulse length corresponding to the percentage distortion setting of potentiometer R23, then capacitor C6 would be discharged and its right side would be at ground potential. However, if the previous spacing pulse had been shorter than this predetermined standard, the potential on the right side of capacitor C6 would still be at some positive value. When the collector voltage of transistor Q4 rises to −18 volts, diode D4 immediately conducts and the right side of capacitor C6 would drop to ground potential discharging the positive voltage remaining on this capacitor. However, since there had been a positive charge on capacitor C6, there would also have been a positive charge on capacitor C7 and when the diode D4 conducts, capacitor C7 discharges, the path being from capacitor C7 through resistor R26 to ground. A negative voltage drop occurs across resistor R26 and this is passed through diode D5 to the base of transistor Q5.

The negative voltage applied to the base of Q5 causes Q5 to conduct and changes the conducting state of one-shot multivibrator 13. Q6 goes nonconducting and the negative voltage excursion at its collector forward biases transistor Q7. Transistor Q7 conducts and current flows through the winding K1 of relay 14 to actuate the relay and to cause an output indicating signal. At the time transistor Q5 went conducting, its collector dropped to ground potential and the negative charge which had previously accumulated on the left side of capacitor C8 became a positive charge on the right side of the capacitor holding transistor Q6 nonconducting. Within a few milliseconds as determined by the setting of the potentiometer R37, capacitor C8 discharges and Q6 once again conducts returning the multivibrator to its stable state. Transistor Q7 cuts off, terminating the operation of relay 14.

While this indication of a distortion occurrence is being registered by relay K1, a marking pulse measurement is simultaneously underway. Capacitor C6 is again being charged by the negative 18 volt source to ready the timing circuit for the subsequent timing cycle. About the time that capacitor C6 becomes charged, the monostable multivibrator 12 returns to its stable state by virtue of the positive charge on capacitor C4 having been dissipated through resistor 18. With Q4 conducting, capacitor C6 once again begins to discharge. When the circuit again goes spacing, the mark-space transition cuts on transistor Q1 and cuts off transistor Q2. The positive voltage excursion at the collector of transistor Q1 is again differentiated and the positive pip is passed by diode D2 to the base of transistor Q4, causing the multivibrator 12 to change to its semi-stable state. If the marking pulse was shorter than the standard pulse length established by the setting of potentiometer R23, then a charge would still be present on capacitor C6 and C7 and the multivibrator 13 would be triggered to its semi-stable state to cause an indication as previously described. Simultaneously capacitor C6 would begin accumulating a charge for measurement of the incoming spacing pulse.

The aforedescribed measurement procedure repeats for every transition in the incoming teletypewriter signals irrespective of whether the transition is mark-to-space or space-to-mark. This invention, therefore, provides a means for charging and discharging a timing capacitor between successive transitions in the input signal and operates independent of the state of the input signal, e.g., mark or space impulses, in distinction over the prior art. As explained, multivibrator 12 responds to these transitions by being triggered to its semi-stable state for a certain time period to permit capacitor C6 to accumulate a charge and then returns to its stable state thus permitting discharge of this capacitor. If capacitor C6 has not dissipated its charge by the time multivibrator 12 again is triggered to its semi-stable state, then the indicating circuit is actuated.

The rate of discharge of capacitor C6 is controlled by resistor R23. Assuming that this resistor is set to a value corresponding to a 25% distortion figure, then as long as both the marking and spacing pulses are not less than 75% of the unit pulse length, capacitor C6 will discharge before multivibrator 12 is triggered in response to the next pulse transition. However, if any incoming pulse is distorted to such an extent that its length is less than 75% of the unit pulse length, the setting of resisor R3 would not permit capacitor C6 to discharge before the next transition occurs and a charge would remain to actuate the indicating circuit.

Typical values for the circuit components of the exemplary embodiment of the invention are indicated in the drawing. The measurement and monitoring of data pulses would use the same circuitry as that previously described with the exceptions that the input circuitry and timing parameters would be altered for compatibility with the parent system.

It will be apparent that various modifications may be made within the spirit and scope of the invention and it is desired, therefore, that only such limitations be placed on the invention as are imposed by the prior art and set forth in the appended claims.

What is claimed is:

1. A monitoring device for measuring and indicating the distortion of pulses in a pulse train comprising a timing capacitor, a variable impedance discharge path connected between one side of said capacitor and a voltage source, monostable trigger means connected to the other side of said timing capacitor for controlling the charging and discharging of said capacitor in response to all transitions of the pulses in the pulse train, said timing capacitor being caused to charge for a set time period in response to each transition in the pulse train and thereafter to begin discharge prior to the arrival of the next transistion in the pulse train, means preventing said one side of said timing capacitor from achieving a voltage larger than a predetermined value, and an indicator drive circuit connected to said one side of said timing capacitor activated when the charge on said capacitor is at a voltage level different from said predetermined value at the end of pulses of reduced length relative to a standard pulse length.

2. A monitoring device as claimed in claim 1 where said monostable trigger means is triggered to its semi-stable state in response to each transition in said pulses to permit charging of said timing capacitor for a set time period and thereafter switches back to its stable state prior to the arrival of the next transition to permit discharging of said capacitor, said device further comprising a first input stage biased to conduct during the presence of a first type of pulses in said train and to be nonconducting during a second type of pulses in said train, a second input stage responsive to the conduction and nonconduction of said first input stage to conduct during the presence of the second type of pulses in said signal and to be nonconducting during the first type of pulses in said signal, the output of said two stages being connected to the input of said monostable trigger means.

3. A monitoring device as claimed in claim 2 wherein said variable impedance discharge path includes a variable resistance calibrated in percent distortion for varying the discharge rate of said timing capacitor, said device further comprising a differentiating circuit connected at the output of each of said stages for forming triggering spikes to trigger said monostable trigger means in response to transitions in said pulses.

4. A monitoring device for measuring and indicating the distortion of marking and spacing types of pulses in a pulse train comprising a timing capacitor, a variable impedance discharge path connected between one side of said capacitor and a voltage source, means connected to the other side of said timing capacitor for controlling the charging and discharging of said capacitor in response to each mark-to-space and space-to-mark transition of said marking and spacing pulses, said timing capacitor being caused to charge for a set time period in response to each transition in the pulse train and thereafter to begin discharge prior to the arrival of the next transition in the pulse train, means preventing said one side of said timing capacitor from achieving a voltage larger than a predetermined value, and an indicator drive circuit connected to said one side of said timing capacitor activated when the charge on said capacitor is at a voltage level different from said predetermined value at the end of pulses of reduced length relative to a standard pulse length.

5. A monitoring device as defined in claim 4 wherein said controlling means is a monostable multivibrator and is triggered to its semi-stable state in response to each first transition in said pulses to permit charging of said timing capacitor for a set time period and thereafter switches back to its stable state prior to the arrival of the next transition to permit discharging of said capacitor.

6. A monitoring device as defined in claim 5 wherein said variable impedance discharge path includes a variable potentiometer calibrated in percentage distortion for a plurality of selected pulse transmission speeds for varying the discharge rate of said timing capacitor.

7. A monitoring device for measuring and indicating the distortion of marking and spacing type pulses in coded signals comprising a first input transistor biased to conduct during the presence of a first type of pulses in said signal and to be shifted to a nonconducting state during a second type of pulses in said signal, a second input transistor responsive to conduction and nonconduction of said first input transistor to conduct during the presence of the second type of pulses in said signal and to be shifted to a nonconducting state during the first type of pulses in said signal, a timing capacitor, a variable impedance discharge path connected between one side of said capacitor and a voltage source, a monostable multivibrator connected to the other side of said capacitor and responsive to said first and second input transistors for controlling the charging and discharging of said capacitor, means preventing said one side of said timing capacitor from achieving a voltage larger than a predetermined value, and an indicator drive circuit connected to said one side of said timing capacitor activated when the charge on said capacitor is at a voltage level different from said predetermined value at the end of pulses of reduced length relative to a standard pulse length.

8. A monitoring device as defined in claim 7 wherein said monostable multivibrator is triggered to its semi-stable state in response to each transition in said pulses to permit charging of said timing capacitor, and thereafter switches back to its stable state to permit discharging of said capacitor.

9. A monitoring device as defined in claim 7 wherein each of said input transistors has a differentiating circuit connected at its output for forming triggering spikes to trigger said monostable multivibrator to change its state in response to the transitions of said marking and spacing pulses.

10. A monitoring device as claimed in claim 9 wherein said indicator drive circuit includes a second monostable multivibrator circuit which is triggered to its semi-stable state when the charge on said capacitor is at said different voltage level thereby to actuate indicating means.

References Cited by the Examiner

UNITED STATES PATENTS

| 2,597,071 | 5/1952 | Cory | 178—69 |
| 2,668,192 | 2/1954 | Cory | 178—69 |
| 3,084,220 | 4/1963 | Britt | 178—69 |

NEIL C. READ, *Primary Examiner.*

T. B. ROBINSON, *Assistant Examiner.*